United States Patent

DiChiara, Jr. et al.

[19]

[11] Patent Number: 5,928,775
[45] Date of Patent: Jul. 27, 1999

[54] SURFACE PROTECTION OF POROUS CERAMIC BODIES

[75] Inventors: Robert A. DiChiara, Jr., San Diego; Steven C. Butner, Poway, both of Calif.

[73] Assignee: McDonnell Douglas Corporation, Huntington Beach, Calif.

[21] Appl. No.: 08/878,217

[22] Filed: Jun. 17, 1997

Related U.S. Application Data

[62] Division of application No. 08/235,369, Apr. 29, 1994, Pat. No. 5,702,761.

[51] Int. Cl.$^6$ ........................................................ B32B 3/26
[52] U.S. Cl. ...................................... 428/312.2; 428/312.6; 428/312.8; 428/325; 428/357; 428/701; 428/702
[58] Field of Search ............................... 428/325, 312.2, 428/312.6, 312.8, 357, 701, 702

[56] References Cited

U.S. PATENT DOCUMENTS 5,702,761  12/1997  DiChiara, Jr. ........................... 427/181

*Primary Examiner*—Timothy M. Speer
*Attorney, Agent, or Firm*—Alston & Bird LLP

[57] ABSTRACT

A surface of a porous ceramic body is protected by binding ceramic particles entirely within the subsurface porosity of the body adjacent to the surface but not present as a separately identifiable surface layer. To produce such a protective layer, a slurry of a mixture of a ceramic powder and a silica-containing binding agent is first prepared. The slurry is impregnated into the surface of the body so that all of the slurry enters the porosity of the body and substantially none of the slurry resides on the surface. The slurry is dried in place, and the residual solids are fired to bind the ceramic powder to the interior walls of the porosity. Drying and firing can be accomplished at intermediate temperatures of about 700–1000° F. using heat lamps, so that the surface protection can be accomplished without removing the ceramic body from a larger structure.

10 Claims, 2 Drawing Sheets

SURFACE PROTECTION OF POROUS CERAMIC BODIES

This application is a division of application Ser. No. 08/235,369, filed Apr. 29, 1994, now U.S. Pat. No. 5,702,761.

BACKGROUND OF THE INVENTION

This invention relates to the surface protection of ceramic bodies, and, more particularly, to the surface protection of porous ceramic bodies such as those used as thermal protection tiles.

Ceramic bodies in the form of tiles are widely used to insulate underlying structures against the high temperatures encountered in some applications. As an example, an aerodynamic vehicle such as the space shuttle or a supersonic aircraft is heated by friction to a high temperature as it flies through the air. The temperature may be greater than the maximum permissible temperature of the metallic airframe and skin structure.

To insulate the airframe structure from the high temperature resulting from frictional heating, a portion of the outside of the skin of the aircraft may be covered by ceramic insulation that can withstand the temperatures experienced during flight. The ceramic insulation is normally provided as tiles of a ceramic material that are affixed to the exterior of the skin, which in turn is supported on the airframe. During flight, the outer surface of the ceramic insulation tile is heated to an extremely high temperature, but the interior surface of the tile remains relatively much cooler because of the poor thermal conductivity of the ceramic material. Consequently, the exterior surface of the skin also remains relatively much cooler than the outer surface of the insulation. The type and thickness of the ceramic insulation are selected to maintain the outer surface of the skin below its maximum permitted temperature.

One known type of ceramic insulation is a porous ceramic made by pressing together fibers of one of more ceramic materials. This fibrous, porous ceramic is resistant to damage from thermal shock and thermal cycling. However, it is relatively soft and can be damaged by external impact and wear forces. To lessen such damage, it is known to apply protecting coatings to the exterior surface of the ceramic insulation.

Several such protective approaches are discussed in U.S. Pat. No. 5,079,082. As described therein, an external protective coating made of a glass or glass/ceramic is applied to the surface of the ceramic insulation and fired. According to the '082 patent, in a prior approach it was known to apply the protective coating solely to the surface of the ceramic article, leaving a distinct interface between the coating and the underlying ceramic insulation. The result is that the protective coating may separate from the underlying ceramic as a result of mechanical or thermal shocks or other forces, a process termed spallation, leaving the underlying ceramic insulation unprotected and subject to accelerated damage. The '082 patent provides an improved protective layer having a diffuse, graded interface, which is intended to minimize the likelihood of such a separation by distributing the separation forces over a larger region than in the prior approach that produces a distinct interface.

While operable to some degree, the prior approaches have drawbacks when used in service applications. There is an interface between the protective layer and the ceramic insulation, albeit diffuse in some cases, that can be the source of spallation failure. Moreover, application of the protective coating requires that the ceramic insulation tile be fired at a high temperature. Thus, to repair a tile that has experienced some damage during service, the tile must be removed from the airframe and processed. This repair approach is expensive and difficult to accomplish when the aircraft is at a remote location unless stocks of all requisite tile configurations are maintained.

There is a need for an improved approach to protecting porous ceramic bodies from surface damage. The present invention fulfills this need, and further provides related advantages.

SUMMARY OF THE INVENTION

The present invention provides a porous ceramic body protected by a hardened surface, and a method for preparing the surface-hardened ceramic body. The surface hardness of the ceramic body is increased significantly by the approach of the invention, making it resistant to damage by mechanical and thermal shocks. There is no interface between an identifiable surface coating and an underlying structure that can potentially debond to cause the surface coating to spall away. The preparation method requires heating to only an intermediate temperature, which can be accomplished by heat lamps or the like. Consequently, the protective material can be applied as a repair without removing the ceramic insulation from its underlying structure. The approach of the invention is fully compatible with other, known approaches to improving the properties of the ceramic body, such as the provision of emissivity control agents at the surface of the ceramic body and the use of waterproofing sealant coatings.

In accordance with the invention, a porous ceramic body having a porous hardened surface comprises a body made of a first ceramic material and having porosity extending through at least a portion of the body adjacent to a first surface of the body. Fired ceramic particles made of a second ceramic material are impregnated into the porosity adjacent to at least the first surface of the body. The ceramic particles reside entirely within the subsurface porosity of the body and are not present as a separately identifiable surface layer. A binding agent binds the fired ceramic powder to the porous body within its porosity.

In one preferred embodiment, the ceramic body is made of a sintered network of silica fibers, aluminoborosilicate fibers, and alumina fibers. The ceramic particles are cordierite, and the binding agent is silica produced by the drying and firing of a silica sol. The ceramic particles have an average size of about two micrometers, so that they can penetrate into the subsurface porosity of the ceramic body.

Further in accordance with the invention, a method of protecting the surface of a porous ceramic body includes the step of furnishing a body made of a first ceramic material and having porosity extending through at least a portion of the body adjacent to a first surface of the body. A slurry is prepared, preferably an aqueous slurry, of a mixture comprising a ceramic powder made of a second ceramic material and a silica-containing binding agent. The slurry is impregnated into the first surface of the body so that all of the slurry enters the porosity of the body and substantially none of the slurry resides on the first surface. The method further includes drying the slurry in place within the porosity of the body to leave a mixture of ceramic powder and binding agent within the porosity, and firing the mixture of ceramic powder and binding agent to cause the binding agent to bind the ceramic powder to the interior of the porosity of the body.

In this preparation procedure, the ceramic powder is preferably cordierite, and the source of the silica-containing binding agent is preferably a silica sol. Preferably, from about 23 to about 29 weight percent of the ceramic powder is mixed with from about 71 to about 79 weight percent of the binding agent in forming the slurry. The slurry is impregnated into the surface of the ceramic body under a mechanical contact pressure, such as with a brush or a squeegee, taking care that substantially none of the slurry remains on the surface of the body. Drying typically is accomplished by heating the slurry-containing region to about 230° F. Firing is typically accomplished by heating the dried region to a temperature of at least about 500° F., and preferably to a temperature of from about 700° F. to about 1000° F.

The protected ceramic body is operable to temperatures of at least 2000° F. or higher, even though the firing temperature is quite moderate. The drying and firing temperatures can be produced either in an oven or by a heat source such as heat lamps directed at the slurry-impregnated surface. The ability to accomplish the drying and firing at the intermediate temperature permits the protective region of the ceramic body to be repaired without removing it from its underlying structure, an important advantage for accomplishing field repairs.

The present invention provides important advances in both the performance and the application of a protective region to a porous ceramic. The protective region resides entirely within the ceramic body adjacent to its surface. Accordingly, there is no surface, diffuse or otherwise, between an external coating of the protective material and the underlying ceramic body that can act as a source of weakness during service. Additionally, the densified layer has a high toughness. There is no dimensional change when the protective material is applied, an important consideration in some situations. The protective material is applied from an aqueous slurry containing no noxious constituents. The slurry can be applied and fired at intermediate temperatures, but the final ceramic body is operable to very high temperatures.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
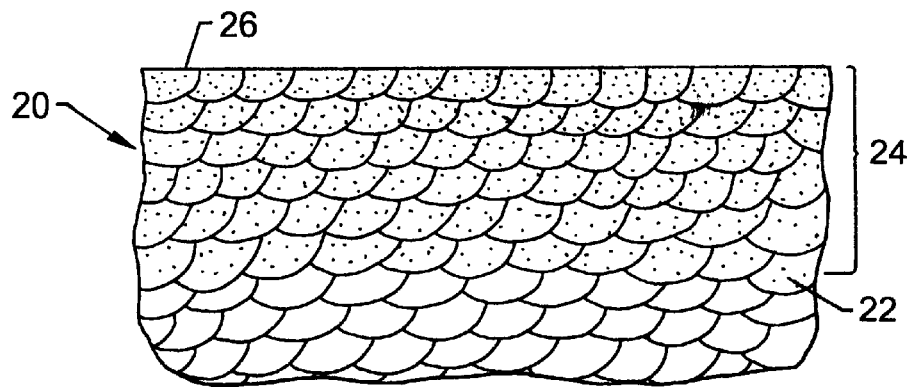
FIG. 1 is a schematic side sectional view of a ceramic body protected by the present approach.

As depicted in FIG. 1, the present invention is preferably embodied in an article 20 comprising a porous ceramic body 22 having protective material in the form of an impregnated protective region 24. The protective region 24 lies immediately below a surface 26 of the ceramic body 22. It is formed by the protective material residing in the porosity of the ceramic body 22. The protective region 24 is substantially below the surface 26 of the ceramic body 22, with only an unintended incidental amount that may lie on or above the surface 26.

Figure 2:
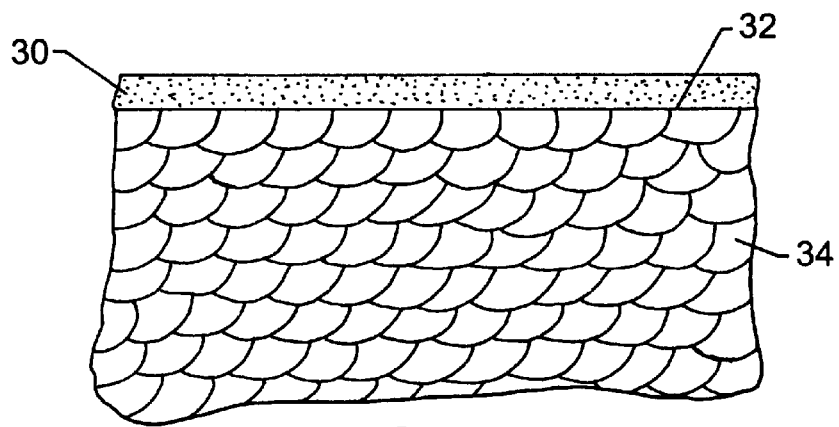
FIG. 2 is a schematic side sectional view of a ceramic body protected by a first prior art approach.
Figure 3:
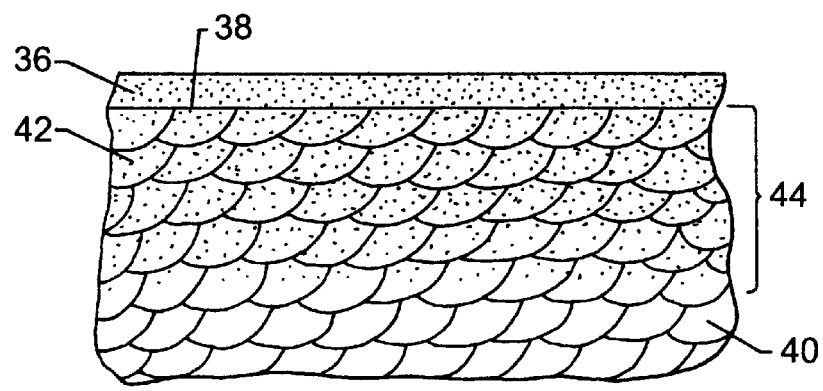
FIG. 3 is a schematic side sectional view of a ceramic body protected by a second prior art approach.

This structure is to be contrasted with that found in prior approaches and illustrated in FIGS. 2 and 3. In one prior approach illustrated in FIG. 2, a separate protective coating 30 is adhered to the exterior of a surface 32 of a porous ceramic body 34. There is a clearly defined interface between the coating 30 and the ceramic body 34, coincident with the surface 32. Substantially none of the coating 30 penetrates into the porosity of the ceramic body 34.

In another prior approach illustrated in FIG. 3, a coating 36 is applied to the exterior of a surface 38 of a porous ceramic body 40. A portion 42 of the coating material is made to penetrate into the porosity of the ceramic body 40. The impregnated portion serves as an interface 44 between the coating 36 and the ceramic body 40 that is more diffuse and therefore more resistant to cracking during service than the sharply defined interface shown in FIG. 2. Nevertheless, there remains a clearly defined surface coating, having none of the underlying ceramic material of the ceramic body 40, joined to the underlying porous ceramic body 40 substrate at an interface 44.

By contrast with the prior approaches of both FIG. 2 and FIG. 3, in the present approach of FIG. 1 there is no separately identifiable coating region having none of the material of the underlying ceramic body 22. Whenever there is a separately identifiable coating at the surface of the protected ceramic article, as in the two illustrated prior approaches, the coating is a potential source of failure by spallation during service.

Figure 4:
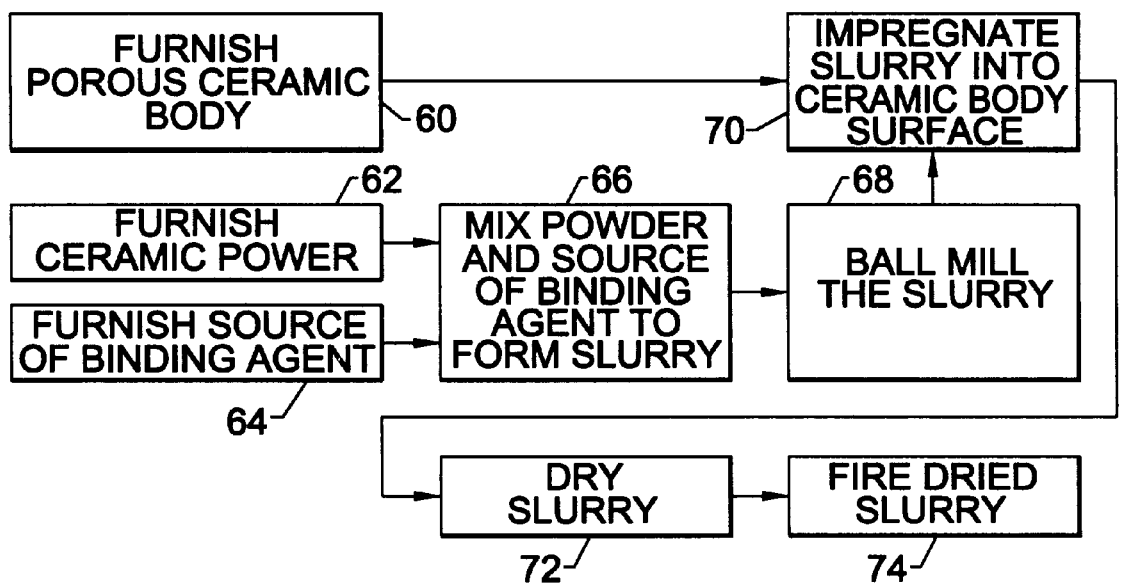
FIG. 4 is a block diagram of a preferred method for practicing the present invention.

FIG. 4 depicts a process for preparing the protected article 20 of FIG. 1. A porous ceramic body 22 is furnished, numeral 60. A number of techniques are known for preparing such a body. Preferably, the ceramic body 22 is made of a first ceramic material by forming a mat of ceramic fibers and then sintering the mat to leave porosity between the fibers. In one known approach, silica fibers, aluminoborosilicate fibers, and alumina fibers are placed into a mold. Various types of particulates and a binder may also be used. A vacuum is drawn on one side of the mold to collapse the fibers into a mat, possibly with other additives captured inside the mat. The mat is heated to a temperature of about 2500° F. to sinter the fibers into the solid ceramic body 22 having porosity therein. The extent and nature of the porosity can be controlled by the manufacturing technique. FIG. 1 schematically depicts a generally equiaxed porosity, but it may be of other geometries as well. Other compositions of the ceramic body and other approaches for preparing the ceramic body can also be used.

A slurry is prepared by a series of steps 62, 64, 66, and 68. To prepare the slurry, a ceramic powder is furnished, numeral 62. The ceramic powder is desirably generally equiaxed particles made of a second ceramic material, preferably having an average particle size of no greater than about two micrometers. The small particle size permits the particles to penetrate into the porosity of the ceramic body 22 during subsequent processing. Larger particles that cannot penetrate the porosity are retained on the surface and are wiped away during the application procedure.

The second ceramic material may be any operable material, but is preferably the ceramic cordierite having a composition $MgAlSiO_3$. Other ceramics such as mullite and zirconia, and mixtures of the various ceramics, can also be used. An operable cordierite powder having an average particle size of about 2 micrometers is available commercially.

A source of a silica-containing binding agent is furnished, numeral 64. The binding agent is preferably a silica sol, comprising small silica particles in the size range of from about 4 to about 150 nanometers. The silica particles are mixed with a carrier liquid, such as water with a small amount of ammonia present. The silica particles are typically present in an amount of from about 15 to about 50 parts by weight of the mixture of silica and liquid, producing a mixture having a viscosity comparable with that of water. An operable silica sol of this type is available commercially.

Other binders can be used, but are less preferred. For example, alumina-coated silica sols and alumina sols are also available and can be used.

Cordierite and silica are the preferred combination of ceramic powder and binder because they each have a lower coefficient of thermal expansion than the preferred ceramic body 22. The subsequent processing results in a protected ceramic body having its surface in compression. A compressive stress state at the surface aids in inhibiting the initiation of surface cracks, thereby improving the resistance of the article 20 to premature fracture.

Appropriate amounts of the ceramic powder and the binder are mixed together, numeral 66. In a preferred approach, from about 23 to about 29 parts by weight of cordierite powder and from about 71 to about 77 weight parts by weight of silica sol are mixed together. The mixture is mixed in a propeller mixer to form a uniform mixture. These proportions yield a mixture in the form of a slurry having a consistency comparable with that of water.

In some applications, it is desirable to modify the emissivity of the ceramic material so that the amount of heat introduced from the environment can be controlled. In such cases, known emissivity-modifying agents can be provided in the slurry. In a preferred approach, molybdenum disilicide ($MoSi_2$) powder can be added to the slurry. Most preferably, molybdenum disilicide powder is substituted for about 10 to about 40 percent of the second ceramic material, which is most preferably cordierite. After subsequent processing, the surface region of the ceramic body has a concentration of the molybdenum disilicide that modifies its emissivity.

The slurry is further mixed in a high shear mixer or a ball mill, numeral 68. A typical high shear mixing is accomplished at 3000 rpm for 3 minutes, or a typical ball milling is accomplished in four hours. The effect of the further mixing 68 is to break down agglomerated (softly bound together) groups of ceramic powder particles, producing a good dispersion of the ceramic powder particles in the silica sol.

The resulting slurry, having a consistency similar to that of water, is applied to the ceramic body 22 so as to impregnate the slurry into the porosity of the ceramic body 22, numeral 70. The application is preferably performed with a mechanical contact pressure to aid in forcing the slurry into the pores, but may also be performed by non-contact techniques such as spraying. In the preferred approach, the slurry is applied using a squeegee or a brush. The amount of the slurry actually introduced into the porosity of the ceramic body is controlled by the amount that is applied to the surface during this application procedure. Although in theory ceramic particles too large to penetrate into the porosity are retained on the surface and can be removed, in practice it has been observed that very little of the properly prepared slurry which is applied to the surface of the ceramic body does not enter the porosity. The amount of slurry, and hence ceramic powder, impregnated into the surface of the ceramic body 22 can therefore be closely controlled. The amount of slurry is desirably such that, after firing, there is an increase in weight of the ceramic body of from about 1.0 to about 6.0 grams per square inch of treated surface area. In the preferred practice, the slurry is provided in an amount of about 3 grams per square inch of protected surface area. This results in an increase in weight of the ceramic body, due to the dried and fired slurry material, of about 2.2 grams per square inch of protected surface area.

After the desired amount of the slurry has been introduced, the slurry is dried at a temperature of from about 180° F. to about 300° F., most preferably about 230° F., numeral 72. The liquid in the slurry is released to the atmosphere during the drying process, leaving a residual solid composed of ceramic particles and silica within the pores. The terminology "drying the slurry" is used herein rather than "heating the ceramic body", because the drying can be accomplished by surface heating techniques such as heat lamps, without heating the entire ceramic body, if desired. Drying can also be accomplished by heating the entire ceramic body, as in a furnace.

The solid residual matter within the pores is fired, numeral 74, to cause the silica binding agent to bind the ceramic particles to the walls of the pores. The firing is accomplished by heating the residual matter to a temperature of about 500° F. or more, most preferably from about 700° F. to about 1000° F. Again, only the solid residual matter at the surface of the ceramic body, not the entire ceramic body, need be heated. In the preferred approach, the firing step is completed in about ½ hour in air.

This firing approach is to be contrasted with that required for prior art approaches, wherein the firing is accomplished at temperatures of 1800° F. or more. The use of the very finely divided binder, preferably silica sol, permits firing at intermediate temperatures. The finely divided silica particles have a high surface area and are quite reactive. Firing and bonding can therefore be accomplished at intermediate temperatures, well below those used in prior approaches.

The drying and firing steps can be conducted by heating the entire ceramic body to the required temperatures. Alternatively, the required temperatures can be achieved using a surface heating source such as a quartz heat lamp directed against the surface into which the slurry was introduced. This latter capability permits in-situ repair and patching of ceramic tiles without removing them from the airframe to which they are attached. That is, if a ceramic article such as a protective thermal tile is damaged during service, the protective region of the present invention can be re-formed by applying the slurry to the damaged area. High-intensity lamps are directed against the area to dry and fire the ceramic mixture. The required temperatures to complete the drying and firing are so low that the ceramic protects the underlying airframe structure from the heat.

Recalling that the ceramic body is of a generally porous structure, it is often desirable to coat the final body with a sealing agent against water penetration. The present approach is fully compatible with the use of sealants, including those presently known in the art. Preferably, when water sealing is desired, a low-viscosity silane coating is applied by any appropriate technique, such as brushing, dipping, or spraying, after all other processing is complete. The silane coating acts as a water seal to prevent water liquid or vapor from penetrating into the surface regions and the interior of the ceramic body. The silane coating is stable to a temperature of about 800° F. If the surface temperature exceeds about 800° F. during service or testing, the sealing coating must be reapplied.

The present approach has been reduced to practice using the preferred approach discussed above.

In one test, one side of a ceramic tile was protected by the approach of the invention, and the other side was not protected. The unprotected side, indicating the properties of the porous ceramic, exhibited a surface hardness of 20 on the Type D durometer scale as measured according to ASTM 2240-75. The protected side had a Type D durometer hardness of 60.

In another test, specimens of protected ceramic pieces were heated to 2000° F. in a furnace. Some specimens were then allowed to air cool to ambient temperature, and others were plunged into water at ambient temperature. No debonding or spallation failures were observed.

In a third test, comparative burner rig studies were performed using an untreated ceramic piece and a treated ceramic piece. Each piece was subjected to a three-step erosive burner rig test to simulate flight conditions. Each cycle had 45 minutes hot and 15 minutes cold. The steps, utilized serially, were: (a) 20 cycles at 1200° F. and 400 feet per second velocity, with 20 degree angle of incidence; (b) 20 cycles at 1200° F. and 400 feet per second velocity, with 70 degree angle of incidence; and (c) 1800° F. and 600 feet per second velocity, with 70 degree angle of incidence. The three procedures represent increasingly severe conditions. Each specimen was subjected to procedure (a), inspected, subjected to procedure (b), inspected, subjected to procedure (c), and inspected. An untreated ceramic piece was not damaged by the first two runs, but showed about 0.010–0.015 inch of erosion after the third run. The treated ceramic piece showed no damage after all three procedures.

Although a particular embodiment of the invention has been described in detail for purposes of illustration, various modifications may be made without departing from the spirit and scope of the invention. Accordingly, the invention is not to be limited except as by the appended claims.

What is claimed is:

1. A porous ceramic body having a porous, hardened surface, comprising:
   a body made of a first ceramic material and having porosity extending through at least a portion of the body adjacent to a first surface of the body;
   fired ceramic particles made of a second ceramic material and impregnated into the porosity adjacent at least the first surface of the body such that substantially all of the fired ceramic particles reside within the subsurface porosity of the body and are not present as a separately identifiable surface layer; and
   a binding agent that binds the fired ceramic particles to the porous body within its porosity.

2. The body of claim 1, wherein the body comprises silica fibers, aluminoborosilicate fibers, and alumina fibers.

3. The body of claim 1, wherein the second ceramic material comprises cordierite.

4. The body of claim 1, wherein the binding agent comprises silica.

5. The body of claim 1, wherein the fired ceramic particles have an average size of about two micrometers.

6. The body of claim 1, wherein the porous body comprises a sintered mat of ceramic fibers.

7. The body of claim 1, further comprising an emissivity-modifying agent within the porosity of the body.

8. The body of claim 7, wherein the emissivity-modifying agent is molybdenum disilicide.

9. The body of claim 1, further comprising a water impermeable sealant coated onto said porous body.

10. A porous ceramic body formed by
    furnishing a body made of a first ceramic material and having porosity extending through at least a portion of the body adjacent to a first surface of the body;
    preparing a slurry of a mixture comprising
       a ceramic powder made of a second ceramic material, and
       a binding agent comprising silica particles;
    impregnating the slurry into the first surface of the body so that substantially all of the slurry enters the porosity of the body and substantially none of the slurry resides on the first surface;
    drying the slurry in place within the porosity of the body to leave a mixture of ceramic powder and binding agent within the porosity; and
    firing the mixture of ceramic powder and binding agent to cause the binding agent to bind the ceramic powder to the interior of the porosity of the body.

* * * * *

UNITED STATES PATENT AND TRADEMARK OFFICE
CERTIFICATE OF CORRECTION

PATENT NO.   : 5,928,775
DATED        : July 27, 1999
INVENTOR(S)  : DiChiara, Jr. et al.

It is certified that error appears in the above-identified patent and that said Letters Patent is hereby corrected as shown below:

On the title page, [56] References Cited, U.S PATENT DOCUMENTS, insert the following:

--4,082,863   04/1978   Dancy
  4,370,363   01/1983   Schulz
  4,735,757   04/1988   Yamamoto
  4,910,079   03/1990   Shroff
  5,079,082   01/1992   Leiser et al.
  5,227,199   07/1993   Harzlebeck--.

On the title page, [56] References Cited, insert the following:
--OTHER PUBLICATIONS
Anon., "*Ceramic-Fibrous-Insulation Thermal-Protection System*", NASA Tech. Briefs, page 48 (Jan. 1992)--.

On the title page [56] References Cited, U.S. PATENT DOCUMENTS, line 1, "DiChiara, Jr." should read --DiChiara, Jr. et al.--.

Signed and Sealed this

Eighth Day of February, 2000

*Attest:*

Q. TODD DICKINSON

*Attesting Officer*        *Commissioner of Patents and Trademarks*